United States Patent Office 2,846,312
Patented Aug. 5, 1958

2,846,312

PROCESS FOR PREPARING FLUID SHORTENING

Claude W. Lantz, La Grange, Walter Marvin Cochran, Highland Park, and Reinhard E. Lutz, Deerfield, Ill., assignors to The Glidden Company, Cleveland, Ohio, a corporation of Ohio No Drawing. Application May 15, 1956
Serial No. 584,890

3 Claims. (Cl. 99—118)

This invention relates to oleaginous compositions which are fluid and which have useful shortening properties. It relates also to a novel method for preparing such fluid shortening products.

It is common practice to convert liquid glyceride oils to non-fluid plastic shortening products by incorporating and/or forming in situ therein desired amounts of normally-solid glycerides. Such compositions are commonly prepared by blending in molten condition and then cooling to room temperature either by spontaneous cooling accompanied by agitation or by rapid chilling on a refrigerated steel roll followed by beating until smooth in consistency. As thus prepared, the compositions rapidly set up to a solid or semi-solid state and remain in this condition when kept at temperatures below about 100° F. If prepared by spontaneous cooling from molten condition without agitation such compositions may acquire a soupy or grainy semi-liquid consistency in which the crystals of solid fat form comparatively large loose clusters and tend to settle to the bottom leaving clear oil at the top.

If in any such compositions, prepared in any of these ways, the content of normally solid triglycerides is around 15% or more of the total, then the products are likely to be semi-plastic or even rigid solids at room temperature.

We have now found that such semi-plastic or rigid solids can be so treated as to become and remain fluid at room temperature. Such fluid products can be readily pumped through the plant and can be easily filled into shipping containers such as bottles or cans. Moreover, the fluid contents of such containers can be easily poured out of them when the ultimate consumer desires to use them as shortenings. We have found that the fluid character of the products is stable indefinitely at room temperatures and higher up to about 100° F.

We are aware of the Mitchell U. S. Patent No. 2,521,-242 which provides permanently pumpable oleaginous suspensions, but our process for preparing fluid shortenings is quite different, as the following description will show. In our process the shortenings are plasticized in the conventional manner as by running through a chilled agitator unit, and then are passed to an agitating vessel where at room temperature the plastic mass is stirred or otherwise agitated for a period of several days until the networks of intermingled crystals have been broken up and the crystals have been dispersed in the liquid oil(s) of the mass. The mass then is thoroughly fluid and non-stratifying and remains so indefinitely.

Accordingly, it is an object of this invention to provide a novel process in which chilled, plasticizable shortening is subjected to prolonged agitation at ambient temperatures until it becomes a fluid suspension.

Another object is to provide an improved fluid shortening having distinctive properties imparted to it by the aforedescribed treatment.

These and other object ancillary thereto will be apparent from the following detailed description and illustrative examples.

As noted briefly above we have found that chilled, plasticizable shortenings can be converted to a stably fluid condition by the simple expedient of agitating them for a prolonged period of time sufficient to break up the interknitted crystals of normally-solid triglycerides contained in the chilled shortening. It should be understood, however, that the agitation, such as can be effected by mere stirring, not only disperses those interknitted crystals originally present in the chilled product but also prevents any new crystals which may be formed in the course of the treatment from becoming entangled and interlaced with themselves or with the original crystals of the plasticized mass. The agitation, as by stirring, should be continued for at least 48 hours, but particular shortenings may require as many as 7–10 days.

The prolonged agitation of the chilled mass is carried out at ambient room temperatures with no need to control the temperature within any narrow limits, such as is required in the treatment described in the Mitchell patent supra. The agitation vessel may, if desired, be a jacketed kettle through which coolant (e. g., tap water) is circulated, but such cooling is primarily effected for the purpose of abstracting heat generated by the mechanical agitation and crystallization of the mass. In this way the mass can be conveniently held at a fairly uniform temperature and excesses of temperature which might lead to a premature termination of the agitation can be avoided.

In our treatment, no effort is made to direct the crystallization of any of the triglycerides to particular allotropic forms. Hence the triglycerides can assume whichever form(s) of crystal are their stable ones under the prevailing conditions of the treatment. Their allotropic forms correspond approximately to those secured by merely storing the chilled shortening at ambient room temperatures without agitation. The recurrent fracturing of crystals during the course of the mechanical agitation treatment also aids in maintaining a condition within the mass under which the crystals assume a stable configuration and size. The tendency of the treatment is to establish crystals of fairly uniform size with little to no tendency on the part of the crystals to grow larger with the passage of time; that is, their tendency to grow has reached an equilibrium state.

Our treatment can be applied successfully to any of the conventional shortenings and like mixtures of triglycerides which can be plasticized in conventional manners, especially those having a content of normally-solid glycerides ranging from about 15% to 35% of the total. The glycerides, whether normally-solid or normally liquid, can be saturated or unsaturated, refined natural oils, refined hydrogenated oils, rearranged fats or oils, crystal-modified fats or oils, and/or synthetic fats and oils blended together and plasticized in any of the known and conventional manners. The shortenings can, of course, include small amounts of any of the various additives which are conventionally employed to improve the shortening qualities of the mixtures of normally-solid and normally-liquid oils, such as emulsifiers, anti-oxidants, coloring agents if desired, etc.

The following examples illustrate the principles of our invention and include the best modes presently known to us for practicing those principles.

*Example 1*

A batch of SGF-type emulsified shortening was prepared so as to be composed of about 30% normally solid triglyceride fat and 70% normally-liquid triglyceride oil and was derived by adding normally-liquid triglyceride oil to a 28° hydrogenated vegetable oil having a Wiley melting point of about 92° F. The shortening was adapted for use as a general-purpose shortening for cake mixes and was prepared by blending the solid and liquid fats in a molten condition with about 4% of superglycerinated fat and then passing the molten blend through a commercial plasticizing unit in which it was agitated under pressure while contacting refrigerated surfaces. A portion of the resulting plasticized shortening was discharged into a storage drum where it was retained for use as a control in comparative baking tests. The remainder of the mass of chilled fat was discharged into a kettle designed for use on an electric power mixer.

acids and glycerine in the molar ratios of 1:1:1) was added to the blend before it was plasticized. This batch will be identified below as "plastic" shortening. A portion of the batch was converted into a fluid product by stirring in the same way and for the same period of time as described above for the S. G. F. batch of Example 1, and the remainder was reserved for use as a control.

The four shortenings were then tested for shortening qualities by employing them in standard white, devil's food and yellow cake recipes. The specific gravity of each batter was noted, and the resulting cakes were measured for volume, were weighed, and were examined for texture. The following table compares the results:

WHITE CAKE

| Shortening Used | Batter | Sp. Gr. | Vol. (ml.) | ml./g. | Gen. Rating | Texture |
|---|---|---|---|---|---|---|
| Example 1—plastic | Sl. curd fluid | .89 | 1,160 | 3.08 | Good | Mod. close. |
| Example 1—fluid | do | .90 | 1,140 | 3.05 | do | Do. |
| Example 2—plastic | Fluid smooth | .78 | 1,190 | 3.17 | V. Good | Close. |
| Example 2—fluid | do | .80 | 1,180 | 3.21 | do | Mod. close. |

DEVIL'S FOOD

| Shortening Used | Batter | Sp. Gr. | Vol. (ml.) | ml./g. | Gen. Rating | Texture |
|---|---|---|---|---|---|---|
| Example 1—plastic | Fluid smooth | .92 | 1,170 | 3.08 | Good | Mod. close, Sl. Irreg. |
| Example 1—fluid | Sl. smooth | .96 | 1,160 | 3.10 | do | Do. |
| Example 2—plastic | Fluid smooth | .81 | 1,340 | 3.56 | Excel | Sl. open, Sl. Irreg. |
| Example 2—fluid | do | .83 | 1,340 | 3.52 | do | Do. |

YELLOW CAKE

| Shortening Used | Batter | Sp. Gr. | Vol. (ml.) | ml./g. | Gen. Rating | Texture |
|---|---|---|---|---|---|---|
| Example 1—plastic | Sl. Fl'd smooth | .90 | 1,260 | 3.30 | Good | Open, Sl. Irreg. |
| Example 1—fluid | do | .96 | 1,225 | 3.23 | do |  |
| Example 2—plastic | do | .86 | 1,320 | 3.48 | Excel | Open Even. |
| Example 2—fluid | do | .86 | 1,300 | 3.40 | do | Open, Sl. Irreg. |

RECIPES
[In percent by weight except eggs.]

| Ingredients | White Cake | Devil's Food | Yellow |
|---|---|---|---|
| Gran. Sugar (Fine) | 44.00 | 42.00 | 44.00. |
| Cake Flour | 37.95 | 35.00 | 37.95. |
| Shortening | 13.50 | 13.50 | 13.50. |
| Salt | 1.00 | 1.00 | 1.00. |
| Non-fat Dry Milk Solids | 2.00 | none | 2.00. |
| Cocoa | none | 7.00 | none. |
| Soda | .65 | 1.10 | .65. |
| Na Acid Pyrophosphate | .60 | .40 | .60. |
| Monocalcium Phosphate | .30 | none | .30. |
| Whole Eggs | none | 2 (100 ml.) | 2 (100 ml.). |
| Egg Whites | 2 (70 ml.) | none | none. |

The kettle and contents were installed on the mixer and a mixing paddle inserted into the contents. The mass in the kettle was then agitated by the power-driven paddle for a total of 218 hours, all at ambient room temperatures. The kettle was of the jacketed type and during the stirring period tap water at 68°–70° F. was circulated through the jacket. The temperature of the mass averaged 76° F. At the end of this time samples showed that the mass had attained a stable fluid condition.

*Example 2*

Another batch of the same blend of oil and fat was also plasticized in the commercial unit in the same manner except that 10% of an emulsifier (a lactic acid, palmitic-stearic acid glyceride prepared in accordance with the disclosure of U. S. Patent No. 2,690,971 and employing lactic acid, commercial mixed palmitic-stearic The cake batters are prepared by mixing 20 oz. of the foregoing ingredients (except eggs or egg whites) with ⅔ cup (160 ml.) of water. The mixing is effected on a conventional household cake mixer at medium speed for 2 minutes. The eggs or egg whites are then added and mixed at low speed for 1 minute. The batter is then scaled into pans and baked at 350° F.

The fluid shortenings of Examples 1 and 2 were tested 120 hours after stirring was stopped and were found to have remained unchanged in fluidity and pumpability.

*Example 3*

Superglycerinated fat emulsifiers can be stably dispersed in liquid oil carriers by treatment comparable to the foregoing to prepare fluid compounded shortenings. The following is typical:

One part by weight of 55° titre superglycerinated peanut oil having a monoglyceride content of 39.4% was prepared in the conventional manner (U. S. Patent No. 2,206,167) by treating peanut oil and glycerine with sodium hydroxide as a catalyst, and then removing the catalyst.

The resulting emulsifier was dissolved with heat in 3 parts by weight of cottonseed salad oil, and the solution was passed into and through a commercial chilling agitator of the Votator type. On emergence from the chilling unit, which had caused the emulsifier to crystallize in a myriad of fine crystals, the plastic crystal-containing mass was agitated in a kettle at room temperature for a period of 48 hours. At the end of this time, it was found that the product was a stable dispersion exhibiting no tendency to set up to a non-fluid, plastic mass. Additional cottonseed salad oil was then added to and blended with the dispersion, the amount so added being sufficient to bring the mono- and di-glyceride content to 10% by weight on the diluted product. Samples of the diluted product were stored at room temperature and observed periodically to see if the dispersed crystals tended to settle out. It was found that no such tendency existed at any time in the course of prolonged storage.

Samples of the diluted product were used in cake baking tests to determine the efficacy of the dispersed emulsifier content. The recipes given hereinabove for white, yellow and devil's food cake were employed in the tests, and the methods of preparation and baking there given were also followed. The only change was in replacing the shortenings of those recipes with the above-described diluted product. The following results were secured.

| Cake | Batter, Sp. Gr. | Cake, Volume, ml./lb. | Cake appearance |
|---|---|---|---|
| White layer | .933 | 1,350 | Nice top. |
| One-bowl yellow | .885 | 1,665 | Perfect, nice peaked top, slightly coarse. |
| Devil's food |  | 1,320 | Very nice, good texture. |
| White layer, using plastic shortening.[1] | .900 | 1,360 | Very good. |

[1] Run as a control for comparison with the white layer cake tests using the fluid shortening.

Samples of the diluted product (10% mono-diglyceride content) were further diluted with cottonseed salad oil to give a mono-diglyceride content of 5%. White layer cake baking tests were run using this more dilute product, with the following results:

| White layer | .982 | 1,275 | Slightly coarse, fairly even, nice top. |
|---|---|---|---|

Samples of the more dilute product were stored at 100° F., 90° F., 65° F. and at refrigerator temperature for 4 days, and then were held at room temperature. There was no separation or settling of the dispersed emulsifier content at any time in the course of these tests, showing the excellent stability of the dispersions.

In comparable tests carried out with 55° titre superglycerinated lard in place of the superglycerinated peanut oil, comparable results were secured.

The foregoing examples illustrate our method for preparing fluid shortenings, and in addition illustrate the utility of such fluid products for shortening purposes. Those skilled in the art will recognize that many variations in the method of preparation and in the uses of the products can be devised without departing from the principles explained above and embodied in the following claims.

Having described our invention, what we claim is:

1. The method of converting plasticizable shortening in a homogeneous liquid condition to a stable fluid condition which comprises the steps of rapidly chilling the plasticizable shortening to develop therein a myriad of fine crystals, and then stirring the so-chilled shortening for a prolonged period of time of at least 48 hours at ambient atmospheric temperatures until the mass has become a moderately uniform fluid dispersion having fine crystals of the normally-solid glycerides of the mass of shortening stably dispersed in the normally-liquid oils of the mass.

2. The method as claimed in claim 1 wherein the normally-solid glycerides amount to between about 15% and 35%.

3. The method as claimed in claim 1 wherein the normally-solid glycerides include some partial glycerides which are effective as emulsifiers.

References Cited in the file of this patent
UNITED STATES PATENTS 2,521,242    Mitchell    Sept. 5, 1950
2,721,803    Ginn    Oct. 25, 1955